Patented Apr. 25, 1944

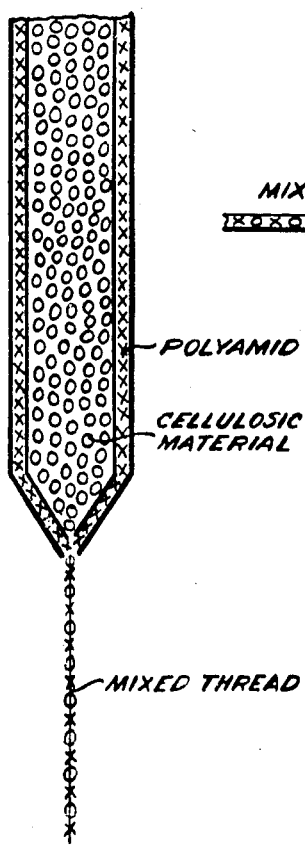
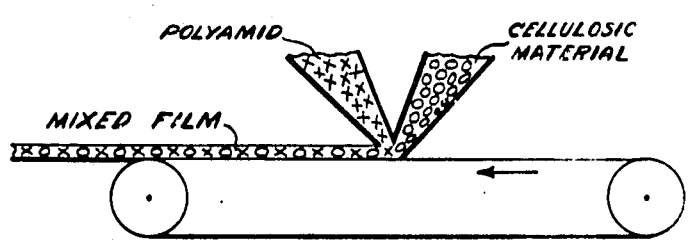
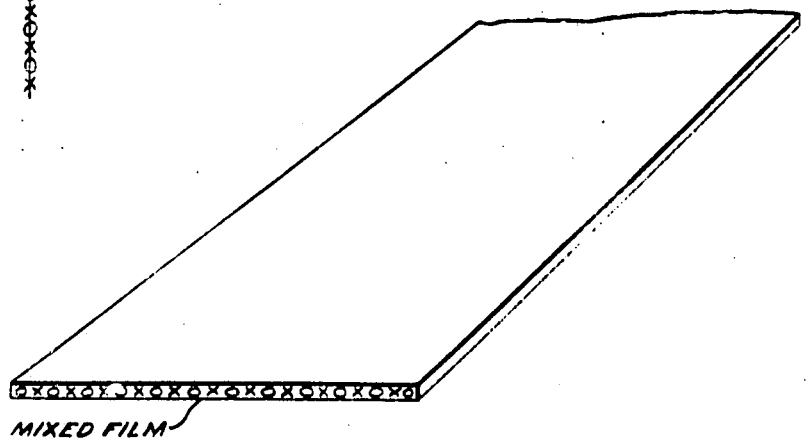

2,347,525

UNITED STATES PATENT OFFICE 2,347,525

MUTUAL PRECIPITATION OF POLYAMIDES AND CELLULOSE

Kurt Thinius, Eilenburg, Germany; vested in the Alien Property Custodian

Application August 24, 1940, Serial No. 354,117
In Germany August 6, 1939

5 Claims. (Cl. 18—54)

This invention relates to the production of mixed structures, foils, filaments, films consisting of polyamides and cellulose or cellulose derivatives.

The so called polyamides being high polymeric compounds are obtained by polycondensation of bifunctional compounds, for instance by polycondensation of $\omega$-amino carboxylic acids with more than five carbon atoms between the amino- and carboxyl groups or their amide forming derivatives, furthermore by polycondensation of $\alpha\omega$-diamines with four and more atoms between the two amino groups and dicarboxylic acids or their functional derivatives, such as esters, acid chlorides, lactams, urethanes, $\alpha\omega$-dihalogen hydrocarbons. Their properties in regard to solubility make it difficult to work them up in the usual way by dissolving them in organic solvents at ordinary or slightly increased temperature. It is possible to form the polyamides thermally, on account of the high temperatures, however, this involves many technical difficulties. Moreover, it was found necessary to give a further treatment to the structures, films, foils or filaments thus obtained, in order to attain maximal mechanical properties. This can either consist in a cold drawing process (in two directions at right angles to each other) which is always connected with a change in the thickness of the structures, or in a further heat treatment at temperatures above 180° C. All these additional measurements render the working-up process more difficult.

It is an object of the present invention to produce mixed structures, foils, films, filaments and the like.

A further object is to manufacture said structures from polyamides and cellulose.

Still another object is to produce these structures from polyamides and cellulose derivatives.

These and other objects will become apparent from the following description.

These aforementioned disadvantages can be eliminated when the polyamides are worked up together with cellulose or its derivatives which are soluble in alkaline media. This is accomplished by the following process. The polyamides are dissolved in acid mediums of at least six times normality, whereupon these solutions are precipitated by an alkaline solution of a dissolved cellulose or cellulose derivative, if necessary after filtration. The polyamide and the cellulose particles are thereby homogenously mixed with each other and give a mixed structure of excellent properties. The mixed structures consisting of cellulose or cellulose derivatives, compared with the pure polyamide structures, have the advantage of showing their maximal mechanical properties immediately after the removal of the liquid, so that the subsequent heat treatment, as mentioned above, is not necessary any more. This represents a considerable technical progress. Furthermore it must be mentioned that the high absorption of water of, for instance, 8–20% according to time and temperature, which is characteristic for the polyamides, has decreased considerably, in the mixed structures obtained according to the present invention. Whereas the high sensitivity against water limits considerably the field of application for the polyamides, the mixed structures consisting of polyamides and cellulose or cellulose derivatives are useful wherever other water-repellent substances have been applied.

Reference is made to the accompanying drawing forming a part of this application, which drawing illustrates preferred means of shaping the mixed structures of this invention and in which:

Figure 1 is a cross section of a double tube consisting of two concentric tubes which converge at one end to a common opening;

Figure 2 is a cross section of an endless belt and two hoppers superimposed thereon;

Figure 3 is a perspective view of a film, one end of which is shown in the cross section.

As seen from the side of the cellulose or its derivatives the mixed structures with polyamide have the advantage of increased flexibility, higher stability on heating and better dyeing characteristics. The following examples may further exemplify the present invention.

Example 1

For the manufacture of a mixed structure in the form of a film consisting of polyamide and cellulose glycolic acid there are dissolved 20 parts of polyamide of a medium degree of condensation corresponding to a K-value of about 35 (in regard to K-value see Cellulosechemie 13, 73 by Fikentscher) in 6 n aqueous hydrochloric acid. This is precipitated through a large slot in a precipitating bath consisting of a solution of 10 parts cellulose sodium glycolate in 80 parts 6 n caustic soda. The precipitating bath flows to the polyamide solution preferably in a counter-current. The film obtained on the place of the entry consists of polyamide and cellulose glycolic acid. The proportion of the two constituents is determined by the proportion of the alkaline cellulose glycolic acid solution to the polyamide solution. If a mixed film being rich in polyamide is desired, the alkaline precipitating bath will be used in a normality smaller than 6 n. It is also possible to dilute carefully the acid polyamide soution up to about ⅓ of its volume with water and to work it up into mixed films by means of cellulose glycolic acid as described above. Also the reverse working process, namely to precipitate the cellulose derivative in a precipitating bath consisting of a polyamide solution is possible.

*Example II*

A polyamide solution according to Example I flows through the inner part of a double-tube and meets at the opening a cellulose solution in ammoniacal copper oxide. A mixed filament consisting of polyamide and cellulose is obtained. The mixed filament, the shape of which depends on the form of the double-tube or of the nozzles is characterized by an increased stability against water as compared with the pure polyamide filament. This is true even when the cellulose portion remains below that of the polyamide. The manufacture of a mixed structure, for instance in the form of foils, may be accomplished also in the following manner: The openings of the polyamide solution and of the alkaline solutions of cellulose or cellulose derivatives being right close to each other are conducted in water or in 2–4 times n hydrochloric acid in such a manner, that mixing of the solutions and consequently formation of a mixed film occurs.

Instead of the ammoniacal copper oxide-cellulose solution a solution of the cellulose ethers or of the ether carboxylic acids or of other derivatives of the cellulose which are soluble in alkali may be used. Also mixtures of these solutions may be employed as precipitating baths. It is also possible to make use of different polyamides. By changing the dose of the polyamide solution or of the alkaline cellulose solution there is a chance of varying extensively the composition of the mixed structures. In this way there can be obtained for instance filaments which are of different composition in different zones. On account of the different dyeing characteristics novelty effects on such fabrics and knitted articles can be obtained.

What I claim is:

1. A process for the production of mixed structures, foils, films and filaments from polyamides and cellulosic material, which process comprises mixing a solution of a polyamide in mineral acid with an alkaline solution of the cellulosic material while shaping the two solutions to the desired form, whereby the polyamide and the cellulosic material are precipitated from their respective solutions in the form desired.

2. A process for the production of mixed structures, foils, films and filaments from polyamides and cellulose, which process comprises mixing a solution of a polyamide in mineral acid with an alkaline cellulosic solution while shaping the two solutions to the desired form, whereby the polyamide and the cellulose are precipitated from their respective solutions in the form desired.

3. A process for the production of mixed structures, foils, films and filaments from polyamides and cellulose, which process comprises mixing a solution of a polyamide in mineral acid with an ammoniacal solution of cellulose while shaping the two solutions to the desired form, whereby the polyamide and the cellulose are precipitated from their respective solutions in the form desired.

4. A process for the production of mixed structures, foils, films and filaments from polyamides and cellulose compounds, which process comprises mixing a solution of a polyamide in mineral acid with an alkaline solution of the cellulose compound while shaping the two solutions in the desired form, whereby the polyamide and the cellulose compound are precipitated from their respective solutions in the form desired.

5. A process for the production of mixed structures, foils, films and filaments from polyamides and cellulose compounds, which process comprises mixing a solution of a polyamide in mineral acid with an ammoniacal solution of the cellulose compound while shaping the two solutions to the desired form, whereby the polyamide and the cellulose compound are precipitated from the respective solutions in the form desired.

KURT THINIUS.